US010400606B2

(12) United States Patent
Roche

(10) Patent No.: US 10,400,606 B2
(45) Date of Patent: Sep. 3, 2019

(54) MISTUNED AIRFOIL ASSEMBLIES

(71) Applicant: UNITED TECHNOLOGIES CORPORATION, Farmington, CT (US)

(72) Inventor: Charles H. Roche, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 347 days.

(21) Appl. No.: 14/512,748

(22) Filed: Oct. 13, 2014

(65) Prior Publication Data
US 2015/0198047 A1 Jul. 16, 2015

Related U.S. Application Data

(60) Provisional application No. 61/927,551, filed on Jan. 15, 2014.

(51) Int. Cl.
F01D 5/16 (2006.01)
F01D 5/28 (2006.01)
F01D 5/10 (2006.01)

(52) U.S. Cl.
CPC ............... F01D 5/16 (2013.01); F01D 5/10 (2013.01); F01D 5/28 (2013.01); F05D 2260/961 (2013.01); F05D 2300/174 (2013.01); Y02T 50/673 (2013.01)

(58) Field of Classification Search
CPC ..... F01D 5/16; F01D 5/26; F01D 5/28; F01D 5/282; F01D 9/02; F01D 25/005; F01D 25/04; F01D 25/06; F01D 5/00; F01D 5/045; F01D 5/10; F04D 29/384; F04D 29/388; F05D 2300/40–2300/48
See application file for complete search history.

(56) References Cited

U.S. PATENT DOCUMENTS

| 4,097,192 A * | 6/1978 | Kulina ...................... F01D 5/16 416/175 |
| 4,501,095 A * | 2/1985 | Drinkuth ................. B24B 19/14 29/889.2 |
| 5,474,421 A | 12/1995 | Rossmann |
| 7,500,299 B2 * | 3/2009 | Dupeux .................... F01D 5/10 29/407.07 |
| 8,043,063 B2 | 10/2011 | Kelly et al. |

(Continued)

FOREIGN PATENT DOCUMENTS

EP 2599962 A1 6/2013

OTHER PUBLICATIONS

Search Report for related European Application No. EP 15151161; report dated May 6, 2015.

Primary Examiner — Jason D Shanske
Assistant Examiner — Brian O Peters
(74) Attorney, Agent, or Firm — Cantor Colburn LLP

(57) ABSTRACT

A mistuned airfoil assembly for a gas turbine engine is disclosed. The mistuned airfoil assembly may comprise a hub and airfoils extending radially from the hub. The airfoils may consist of first airfoils and at least one second airfoil. The first airfoils may be formed from a first titanium alloy and the at least one second airfoil may be formed from a second titanium alloy. The first titanium alloy and the second titanium alloy may have different natural frequencies.

16 Claims, 4 Drawing Sheets

(56) References Cited

U.S. PATENT DOCUMENTS

| | | | |
|---|---|---|---|
| 8,137,053 B2* | 3/2012 | McMillan | G01N 24/08 |
| | | | 415/118 |
| 8,656,589 B2* | 2/2014 | Kurt-Elli | F01D 5/16 |
| | | | 29/402.18 |
| 2007/0036658 A1* | 2/2007 | Morris | F01D 5/16 |
| | | | 416/229 A |
| 2009/0104030 A1 | 4/2009 | McMillan | |
| 2012/0099961 A1* | 4/2012 | Delvaux | F01D 5/142 |
| | | | 415/62 |

* cited by examiner

MISTUNED AIRFOIL ASSEMBLIES

CROSS-REFERENCE TO RELATED APPLICATION

This application is a non-provisional claiming priority under 35 USC § 119(e) to U.S. Provisional Ser. No. 61/927,551 filed on Jan. 15, 2014.

FIELD OF DISCLOSURE

The present disclosure generally relates to gas turbine engines, and more specifically, relates to airfoil assemblies in gas turbine engines having intentionally mistuned airfoils.

BACKGROUND

Gas turbine engines, such as those used to provide thrust to an aircraft, are internal combustion engines that use air as the working fluid. In general, gas turbine engines may include a fan section and a core engine located downstream of the fan section. During operation, air may be drawn into the engine and accelerated by the fan section, and a fraction of the indrawn air may be routed through a primary flowpath defined by the core engine. In an upstream to downstream order, the core engine may include: 1) a compressor section, 2) one or more combustors, 3) a turbine section, and 4) an exhaust nozzle. In the primary flowpath, the air may first be compressed/pressurized in the compressor section and it may then be combusted with fuel in the combustor(s) to generate hot combustion gases. The hot combustion gases may then expand through the turbine section, where energy may be extracted to drive the rotation of the turbine section, the compressor section, and the fan section. The gases may then be exhausted through the exhaust nozzle to provide primary forward thrust to an associated aircraft, or to provide power if used in other applications.

The fan section, the compressor section, and the turbine section of a gas turbine engine may each include one or more airfoil assemblies which may consist of a hub and a plurality of flow-directing airfoils extending radially from the hub. The airfoils may be rotating blades or non-rotating stator vanes, depending on the type of airfoil assembly. Each of the airfoils may be associated with a natural frequency which may be the frequency or frequencies at which the airfoil vibrates. In general, the natural frequency of an airfoil may be a function of the modulus of elasticity of the airfoil, the density of the airfoil, and as well as the geometry of the airfoil. Airfoils in gas turbine engines may be carefully configured to both provide both aerodynamic efficiency and resistance to flutter vibrations caused by dynamic amplification. Dynamic amplification may occur if any vibration frequencies interacting with the airfoils (such as vibration frequencies from the wind, the air/gas working fluid, or engine rotations/vibrations) match the natural frequency of any of the airfoils. As significant flutter vibrations may cause stress on the airfoils as well as structural damage, the airfoils may be designed such that their natural frequencies are sufficiently outside of the engine's anticipated vibration frequency range.

Airfoils may be increasingly susceptible to flutter vibrations caused by dynamic amplification if two or more adjacent airfoils have identical natural frequencies, or are "tuned", causing "staged vibrations" in which two or more airfoils harmonize and vibrate together. With advances in airfoil manufacturing processes over the past decades, airfoils may be more readily produced with uniform structures and properties. While these advances may be beneficial for airfoil aerodynamic performance, the probability of staged vibrations may be increased.

To reduce the occurrence of staged vibrations, one or more of the airfoils in an airfoil assembly may be intentionally "mistuned" to disrupt any uniformity in airfoil natural frequencies. For example, U.S. Pat. No. 8,043,063 describes an integrally bladed rotor having airfoils with different geometries (and therefore, different natural frequencies) alternating in series. As another approach, the tips of one or more airfoils may be intentionally broken off to achieve mistuning in an airfoil assembly. However, the latter approach may be less than ideal as the aerodynamic performance of the broken airfoils may be compromised. In addition, either mistuning strategy may result in added expenses and complications related to part tracking and inventory, as they may result in multiple airfoil part numbers, forging shapes, part geometry files, and maintenance files.

Clearly, there is a need for improved strategies for intentionally mistuning airfoils in gas turbine engines.

SUMMARY

In accordance with one aspect of the present disclosure, a mistuned airfoil assembly for a gas turbine engine is disclosed. The mistuned airfoil assembly may comprise a hub and airfoils extending radially from the hub. The airfoils may comprise first airfoils and at least one second airfoil. The first airfoils and the at least one second airfoil may be formed from different materials having different natural frequencies.

In another refinement, the first airfoils and the at least one second airfoil may have identical geometries.

In another refinement, the first airfoils may each be formed from a first titanium alloy and the at least one second airfoil may be formed from a second titanium alloy. The first titanium alloy and the second titanium alloy may have different natural frequencies.

In another refinement, a difference between a natural frequency of the first titanium alloy and a natural frequency of the at least one second titanium alloy may be at least about 5%.

In another refinement, a difference between a natural frequency of the first titanium alloy and a natural frequency of the second titanium alloy may be at least about 8%.

In another refinement, the airfoils may comprise a plurality of the second airfoils.

In another refinement, the first airfoils and the second airfoils may be arranged in an alternating sequence.

In another refinement, the first titanium alloy may comprise between about 5.5% and about 6.75% aluminum, between about 3.5% and about 4.5% vanadium, and a remainder titanium.

In another refinement, the second titanium alloy may comprise between about 7.35% and about 8.35% aluminum, between about 0.75% and about 1.25% vanadium, and a remainder titanium.

In another refinement, the first titanium alloy may have a density that is about 2% greater than a density of the second titanium alloy.

In another refinement, the second titanium alloy may have a modulus of elasticity that is about 6% greater than a modulus of elasticity of the first titanium alloy.

In accordance with another aspect of the present disclosure, a gas turbine engine is disclosed. The gas turbine engine may comprise a fan section and a core engine located downstream of the fan section. The core engine may comprise: 1) a compressor section, 2) a combustor located downstream of the compressor section, and 3) a turbine section located downstream of the combustor. The gas turbine engine may further comprise at least one mistuned airfoil assembly located in at least one of the fan section, the compressor section, and the turbine section. The mistuned airfoil assembly may comprise a hub and airfoils extending radially from the hub. The airfoils may comprise first airfoils and at least one second airfoil. The first airfoils and the at least one second airfoil may be formed from different materials having different natural frequencies.

In another refinement, the first airfoils and the at least one second airfoil may have identical geometries.

In another refinement, the first airfoils may each be formed from a first titanium alloy and the at least one second airfoil may be formed from a second titanium alloy. The first titanium alloy and the second titanium alloy may have different natural frequencies.

In another refinement, a difference between a natural frequency of the first titanium alloy and a natural frequency of the second titanium alloy may be at least about 5%.

In another refinement, the airfoils may comprise a plurality of the second airfoils.

In another refinement, the first airfoils and the second airfoils may be arranged in an alternating sequence.

In another refinement, the first titanium alloy may comprise between about 5.5% and about 6.75% aluminum, between about 3.5% and about 4.5% vanadium, and a remainder titanium.

In another refinement, the second titanium alloy may comprise between about 7.35% and about 8.35% aluminum, between about 0.75% and about 1.25% vanadium, and a remainder titanium.

In accordance with another aspect of the present disclosure, a mistuned airfoil assembly is disclosed. The mistuned airfoil assembly may comprise a hub and airfoils extending radially from the hub. The airfoils may comprise first airfoils and at least one second airfoil having identical geometries. The first airfoils may each be formed from a first titanium alloy and the at least one second airfoil may be formed from a second titanium alloy. The first titanium alloy and the second titanium alloy may have different natural frequencies.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
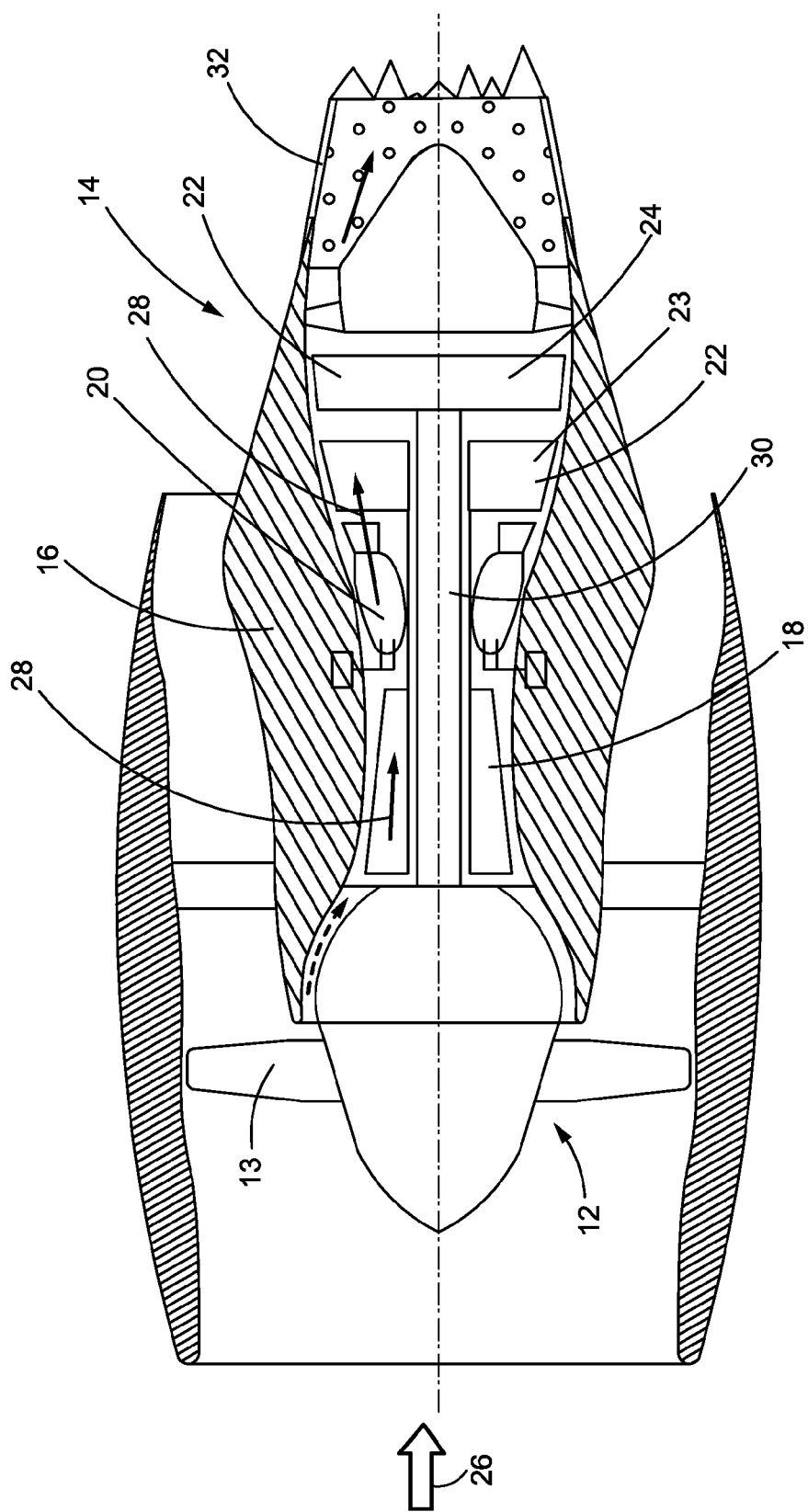
FIG. 1 is a cross-sectional view of a gas turbine engine, constructed in accordance with the present disclosure.

Referring now to the drawings, and with specific reference to FIG. 1, a gas turbine engine 10 is depicted. The gas turbine engine 10 may be associated with an aircraft to provide thrust, or it may be used to provide power in other applications. It may consist of a fan section 12 having a fan 13, as well as a core engine 14 which may be enclosed in an engine case 16 and located downstream of the fan section 12. In an upstream to downstream direction, the core engine 14 may include: 1) a compressor section 18 (which may include a low pressure compressor and a high pressure compressor), 2) an annular combustor 20 (although a series of circumferentially-spaced 'can' combustors may also be used), and 3) a turbine section 22 (which may include a high pressure turbine 23 and a low pressure turbine 24). Other architectures may further include a three-spool engine including mid pressure compressor and turbine sections.

In operation, air 26 may be drawn into the gas turbine engine 10 and accelerated by the fan section 12. After passing the fan section 12, a fraction of the indrawn air may be routed through a primary flowpath 28 defined by the core engine 14. In the primary flowpath 28, the air 26 may first be compressed and pressurized in the compressor section 18, and it may then enter the combustor(s) 20 where it may be mixed with fuel and combusted to generate hot combustion gases. The hot combustion gases may then expand through and drive the rotation of the turbine section 22 which may, in turn, drive the rotation of the compressor section 18 and the fan section 12, as all may be connected on a shaft 30. The gases may then be exhausted through an exhaust nozzle 32 to provide forward thrust to an associated aircraft.

Figure 2:
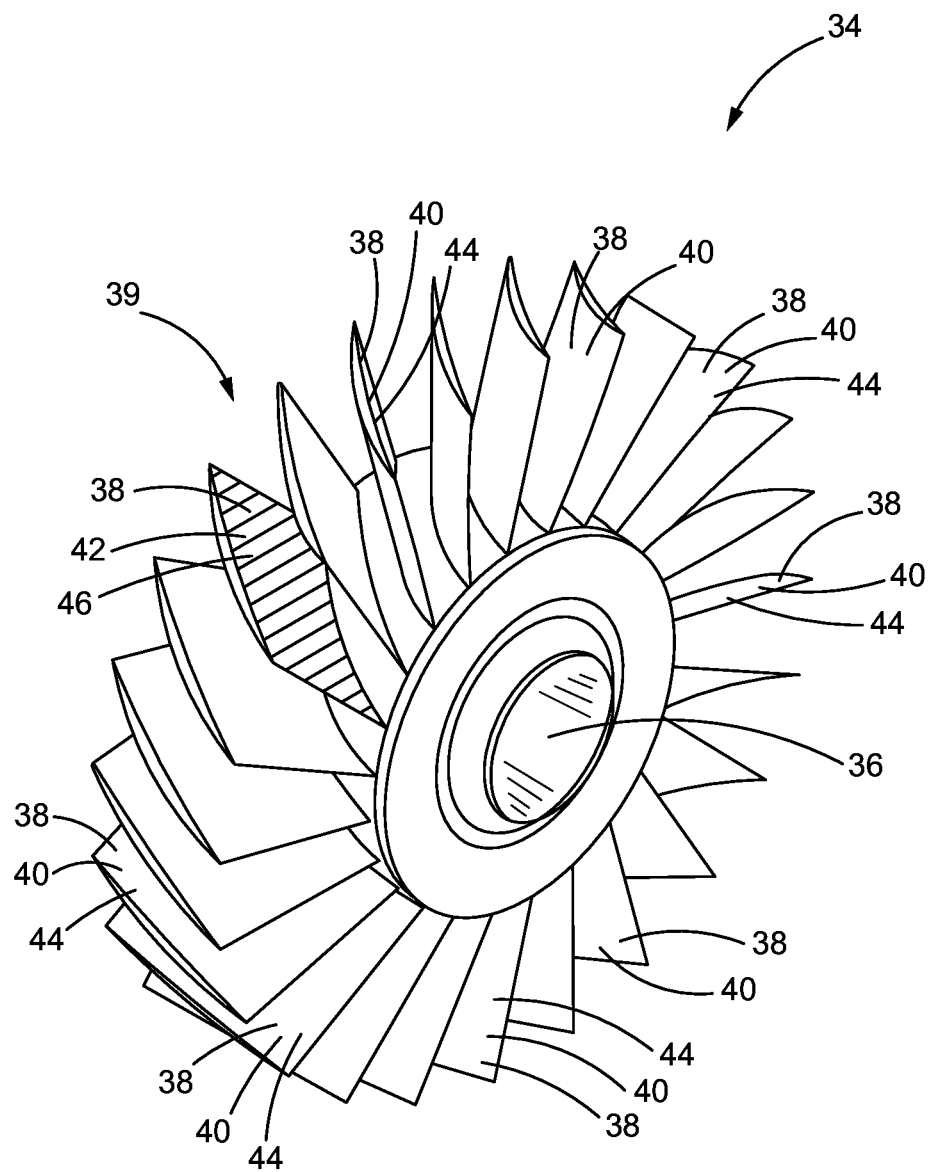
FIG. 2 is perspective view of a mistuned airfoil assembly of the gas turbine engine of FIG. 1, having a plurality of first airfoils and at least one second airfoil, constructed in accordance with the present disclosure.

One or more of the fan section 12, the compressor section 18, and the turbine section 22 may include one or more mistuned airfoil assemblies 34, as shown in FIG. 2. For example, the mistuned airfoil assembly 34 may be the fan 13, or it may be a rotating or stationary stage of the compressor section 18 or the turbine section 22. The mistuned airfoil assembly 34 may include a hub 36 and a plurality of airfoils 38 extending radially from the hub 36 to create a circumferential row 39 of airfoils, with the number of airfoils 38 varying depending on the application of the mistuned airfoil assembly 34. The airfoils 38 may either be rotating blades or non-rotating stator vanes depending on the use of the airfoil assembly 34. The airfoils 38 and the hub 36 may form separate units with the airfoils 38 being connected to the hub 36, such as by a mechanical connection, or they may be integrally formed as a single unit.

The airfoils 38 of the mistuned airfoil assembly 34 may include a plurality of first airfoils 40 and at least one second airfoil 42. The first airfoils 40 and the second airfoil(s) 42 may be geometrically identical, and in some cases, they may even appear identical in color and texture to the naked eye. However, the first airfoils 40 and the second airfoil(s) 42 may be formed from different materials having different natural frequencies such that the airfoils 38 of the assembly 34 may be at least somewhat mistuned and resistant to staged vibrations. The difference in natural frequencies between the first airfoils 40 and the second airfoil(s) 42 may be at least about 5% or at least about 8%. As will be understood by those skilled in the art, the natural frequency of an airfoil may be proportional to the square root of the modulus of elasticity of the airfoil 38 and it may be inversely proportional to the density of the airfoil 38. Accordingly, the first airfoils 40 and the second airfoil(s) 42 may have different moduli of elasticity and/or different densities to provide an appropriate difference in natural frequencies.

As one possibility, the first airfoils 40 may be formed from a first titanium alloy 44 and the second airfoil(s) 42 may be formed from a second titanium alloy 46. For example, the first titanium alloy 44 may be Grade 5 titanium (or titanium 6-4) and it may include from about 5.5 weight (wt) % to about 6.75 wt % aluminum, from about 3.5 wt % to about 4.5 wt % vanadium, up to about 0.08 wt % carbon, up to about 0.015 wt % hydrogen, up to about 0.25 wt % iron, up to about 0.05 wt % nitrogen, and up to about 0.2 wt % oxygen, with the remainder of the alloy being titanium. In addition, the second titanium alloy 46 may be titanium 8-1-1 and it may include from about 7.35 wt % to about 8.35 wt % aluminum, from about 0.75 wt % to about 1.25 wt % vanadium, up to about 0.08 wt % carbon, up to about 0.0125 wt % hydrogen, up to about 0.3 wt % iron, between about 0.75 wt % and about 1.25 wt % molybdenum, up to about 0.05 wt % nitrogen, and up to about 0.12 wt % oxygen, with the remainder being titanium. With the above compositions, the second titanium alloy 46 may have a modulus of elasticity that is about 6% greater than a modulus of elasticity of the first titanium alloy 44. In particular, the modulus of elasticity of the first titanium alloy 44 may be about 114 gigapascals (GPa) and the modulus of elasticity of the second titanium alloy 46 may be about 121 GPa. Moreover, and the second titanium alloy 46 may have a density that is about 2% less than the density of the first titanium alloy 44. As a result of such property differences, the second titanium alloy 46 may have a natural frequency that it about 8% higher than a natural frequency of the first titanium alloy 44. However, it will be understood that other types of titanium alloys, other metal alloys, other metals, or other materials may also be used provided that the different material compositions have a natural frequency difference of at least 5% and the material compositions are compatible with the intended application of the mistuned airfoil assembly 34.

If the mistuned airfoil assembly 34 has more than one of the second airfoils 42, the respective positions of the second airfoils 42 in the circumferential row 39 may be randomly selected or they may be selected to prevent anticipated staged vibrations. In any event, it may be desirable to avoid spacing the second airfoils 180° apart in the circumferential row 39 to prevent a symmetrical arrangement. Suitable separation angles for two of the second airfoils 42 may be between about 100° and about 170°, or another angle other than 180°.

Figure 4:
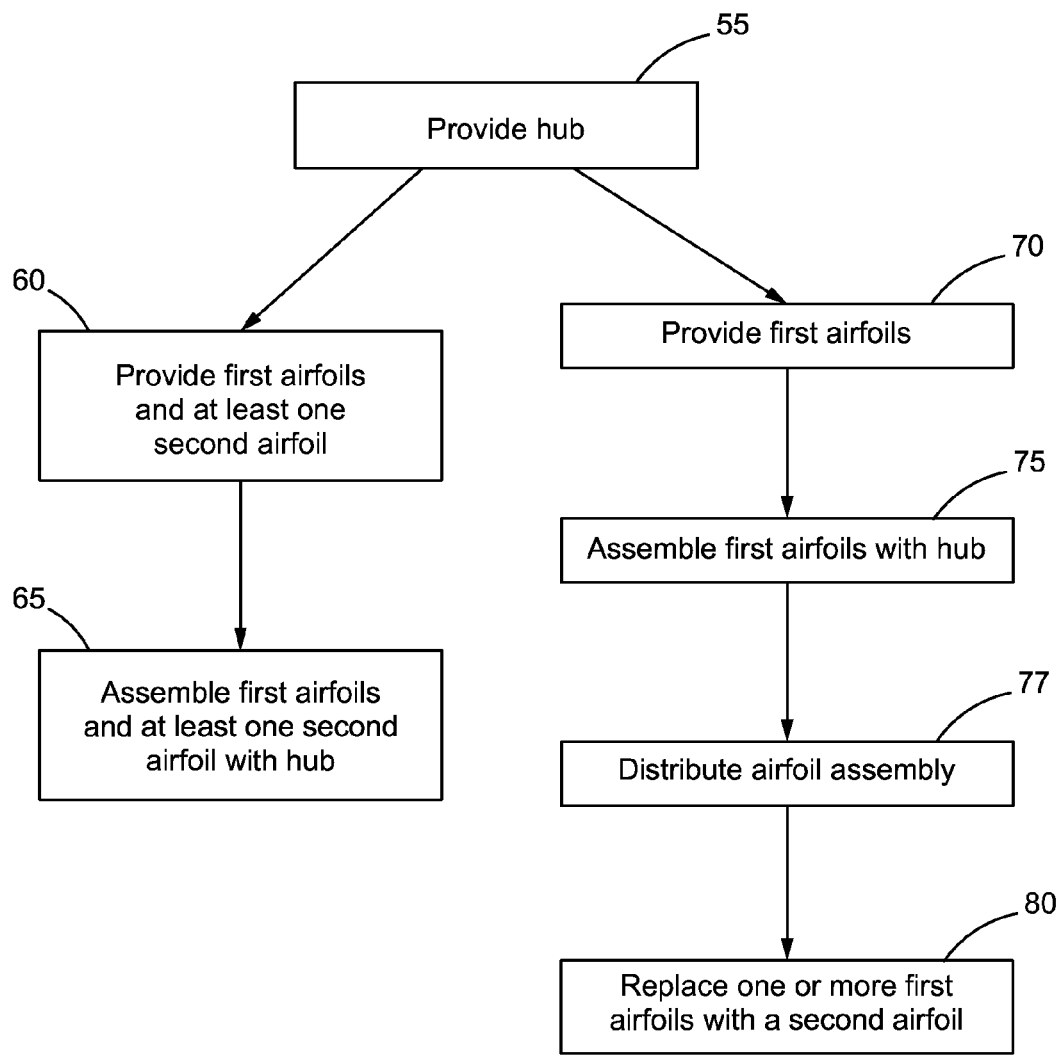
FIG. 4 is a flowchart depicting a sequence of steps which may be involved in fabricating the mistuned airfoil assembly, in accordance with a method of the present disclosure.

Turning now to FIG. 4, the first airfoils 40 and the second airfoils 42 may be arranged in an alternating sequence 50. The alternating sequence 50 may be particularly advantageous as it avoids positioning two airfoils 38 with the same natural frequency immediately adjacent to each other. As a result, the occurrence of staged vibrations may be at least minimized if not eliminated.

Figure 3:
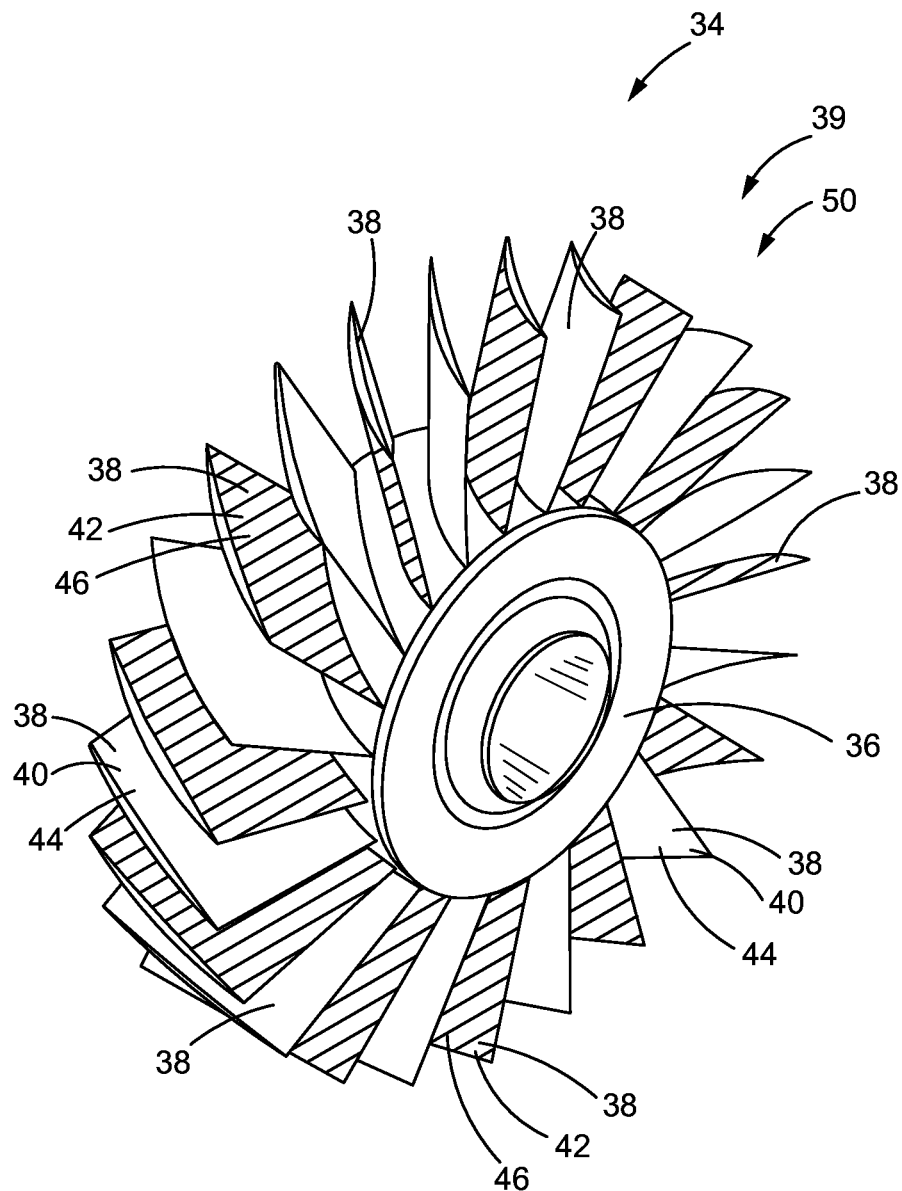
FIG. 3 is a perspective view similar to FIG. 2, but having the first airfoils and the second airfoils arranged in an alternating sequence, constructed in accordance with the present disclosure.

A series of steps which may be involved in fabricating the mistuned airfoil assembly 34 are illustrated in FIG. 4. In particular, the mistuned airfoil assembly 34 may be manufactured with the airfoils 38 mistuned prior to distribution to a customer, or it may be produced during the repair or maintenance of an airfoil assembly initially having only the first airfoils 40. In the former case, the hub 36 may be provided according to a first block 55, and the first airfoils 40 and the at least one second airfoil 42 may be provided according to a next block 60, as shown. The first airfoils 40 and the at least one second airfoil 42 may then be assembled with the hub 36 to provide the mistuned airfoil assembly 34 according to a next block 65. As explained above, the relative positions of the second airfoil(s) 42 may be selected to prevent anticipated staged vibrations or they may be randomly selected. Alternatively, the first airfoils 40 and the second airfoils 42 may be arranged in an alternating sequence 50, as shown in FIG. 3.

If the mistuned airfoil assembly 34 is produced during the repair or maintenance of an airfoil assembly initially having only the first airfoils 40, the airfoil assembly may first be manufactured by providing the hub (block 55), providing the first airfoils 40 (block 70), and assembling the first airfoils 40 with the hub (block 75). The airfoil assembly having the first airfoils 40 may then be distributed to a customer for use in a gas turbine engine or for another application (block 77). If flutter vibrations present a problem during use, one or more of the first airfoils 40 may be replaced with a second airfoil 42 during repair or maintenance, as shown by a block 80. The replacement of one or more of the first airfoils with a second airfoil 42 may provide the mistuned airfoil assembly 34.

Although the airfoil assembly arrangements disclosed herein use two different types of airfoils with different natural frequencies, it will be understood that variations including more than two types of airfoils with different natural frequencies are also within the scope of this disclosure. In addition, while the present disclosure generally relates to gas turbine engine applications, the concepts disclosed herein may be extended to provide mistuned airfoil assemblies for other applications as well, such as, but not limited to, applications using titanium-based airfoils.

INDUSTRIAL APPLICABILITY

In general, it can therefore be seen that the technology disclosed herein may have industrial applicability in a variety of settings including, but not limited to, gas turbine engine construction. The present disclosure introduces a strategy for intentionally mistuning airfoils in airfoil assemblies to assist in preventing staged flutter vibrations. The strategy relies on using at least two different types of airfoils which have identical geometries but different material compositions with different natural frequencies. As disclosed herein, this may be achieved by using airfoils formed from different titanium alloys that have different moduli of elasticity and/or different densities. The mistuned airfoil assembly may include at least one second type of airfoil to provide some resistance to staged flutter vibrations, or it may include an alternating sequence of the two types of airfoils to provide even further protection against staged vibrations. Unlike current methods for mistuning airfoils which rely on breaking off tips of the airfoils or using airfoils with different geometries, the strategy disclosed herein may preserve the aerodynamic performance of the airfoils and it may reduce costs and simplify part tracking/inventory, as the two types of airfoils may share the same forging shape, geometry file, and part number. The technology disclosed herein may find wide industrial applicability in areas such as, but not limited to, aerospace and power generation applications.

What is claimed:

1. A mistuned airfoil assembly for a gas turbine engine, comprising:
a hub; and
airfoils extending radially from the hub, the airfoils consisting of a plurality of identical first airfoils and a single second airfoil, the first airfoils and the single second airfoil being formed from different alloys and having different natural frequencies, the single second airfoil configured with a natural frequency selected to prevent staged flutter vibration of the mistuned airfoil assembly, wherein the first airfoils and the single second airfoil have different densities.

2. The mistuned airfoil assembly of claim 1, wherein the first airfoils and the single second airfoil have identical geometries.

3. The mistuned airfoil assembly of claim 2, wherein the first airfoils are each formed from a first titanium alloy and the single second airfoil is formed from a second titanium alloy, and wherein the first airfoils and the single second airfoil have different natural frequencies.

4. The mistuned airfoil assembly of claim 3, wherein the difference between the natural frequency of the first airfoils and the natural frequency of the single second airfoil is at least 5%.

5. The mistuned airfoil assembly of claim 3, wherein the difference between the natural frequency of the first airfoils and the natural frequency of the single second airfoil is at least 8%.

6. The mistuned airfoil assembly of claim 3, wherein the first titanium alloy comprises:
   between 5.5% and 6.75% aluminum;
   between 3.5% and 4.5% vanadium; and
   a remainder titanium.

7. The mistuned airfoil assembly of claim 6, wherein the second titanium alloy comprises:
   between 7.35% and 8.35% aluminum;
   between 0.75% and 1.25% vanadium; and
   a remainder titanium.

8. The mistuned airfoil assembly of claim 7, wherein the first titanium alloy has a density that is 2% higher than a density of the second titanium alloy.

9. The mistuned airfoil assembly of claim 8, wherein the second titanium alloy has a modulus of elasticity that is 6% greater than a modulus of elasticity of the first titanium alloy.

10. A gas turbine engine, comprising:
    a fan section;
    a core engine located downstream of the fan section, the core engine comprising
    a compressor section,
    a combustor located downstream of the compressor section, and
    a turbine section located downstream of the combustor; and
    at least one mistuned airfoil assembly located in at least one of the fan section, the compressor section, and the turbine section, the mistuned airfoil assembly comprising:
    a hub, and
    airfoils extending radially from the hub, the airfoils consisting of a plurality of identical first airfoils and a single second airfoil, the first airfoils and the single second airfoil being formed from different alloys and having different natural frequencies, the single second airfoil configured with a natural frequency selected to prevent staged flutter vibration of the mistuned airfoil assembly wherein the first airfoils and the single second airfoil have different densities.

11. The gas turbine engine of claim 10, wherein the first airfoils and the single second airfoil have identical geometries.

12. The gas turbine engine of claim 11, wherein the first airfoils are each formed from a first titanium alloy and the single second airfoil is formed from a second titanium alloy, and wherein the first airfoils and the single second airfoil have different natural frequencies.

13. The gas turbine engine of claim 12, wherein the difference between the natural frequency of the first airfoils and the natural frequency of the single second airfoil is at least 5%.

14. The gas turbine engine of claim 12, wherein the first titanium alloy comprises:
    between 5.5% and 6.75% aluminum;
    between 3.5% and 4.5% vanadium; and
    a remainder titanium.

15. The gas turbine engine of claim 14, wherein the second titanium alloy comprises:
    between 7.35% and 8.35% aluminum;
    between 0.75% and 1.25% vanadium; and
    a remainder titanium.

16. A mistuned airfoil assembly, comprising:
    a hub; and
    airfoils extending radially from the hub, the airfoils consisting of a plurality of identical first airfoils and a single second airfoil having identical geometries, the first airfoils each being formed from a first titanium alloy and the single second airfoil being formed from a second titanium alloy, the first airfoils and the single second airfoil have different natural frequencies, the single second airfoil configured with a natural frequency selected to prevent staged flutter vibration of the mistuned airfoil assembly, wherein the first airfoils and the single second airfoil have different densities.

* * * * *